HEXAGONAL SILICON CARBIDE CRYSTALS PRODUCED FROM AN ELEMENTAL SILICON VAPOR DEPOSITED ONTO A CARBON PLATE

Original Filed Jan. 2, 1959 2 Sheets-Sheet 1

INVENTOR
EDWIN C. LOWE
BY Allan R. Redrow
ATTORNEY

INVENTOR
EDWIN C. LOWE
BY Allan R. Redrow
ATTORNEY

United States Patent Office

Re. 26,941
Reissued Aug. 25, 1970

26,941

HEXAGONAL SILICON CARBIDE CRYSTALS PRODUCED FROM AN ELEMENTAL SILICON VAPOR DEPOSITED ONTO A CARBON PLATE

Edwin C. Lowe, Niagara Falls, Ontario, Canada, assignor to Norton Company, Worcester, Mass., a corporation of Massachusetts Original No. 3,147,159, dated Sept. 1, 1964, Ser. No. 63,572, Oct. 19, 1960, which is a division of application Ser. No. 784,791, Jan. 2, 1959, now Patent No. 3,025,192. Application for reissue July 15, 1966, Ser. No. 572,166

Int. Cl. C01b *31/36*

U.S. Cl. 23—208 3 Claims

Matter enclosed in heavy brackets [ ] appears in the original patent but forms no part of this reissue specification; matter printed in italics indicates the additions made by reissue.

*ABSTRACT OF THE DISCLOSURE*

*Large thin hexagonal silicon carbide crystals are produced in a reaction furnace by growth from the vapor phase on a carbon surface. An appreciable vapor pressure of silicon is generated in the furnace and the volume between an external carbon heating element and the carbon growth surface is essentially free of solid silicon carbide to provide free flow of silicon-containing vapors between the source of such vapors, the hot portion of the carbon heating element and the cooler carbon growth surface.*

Figure 1:
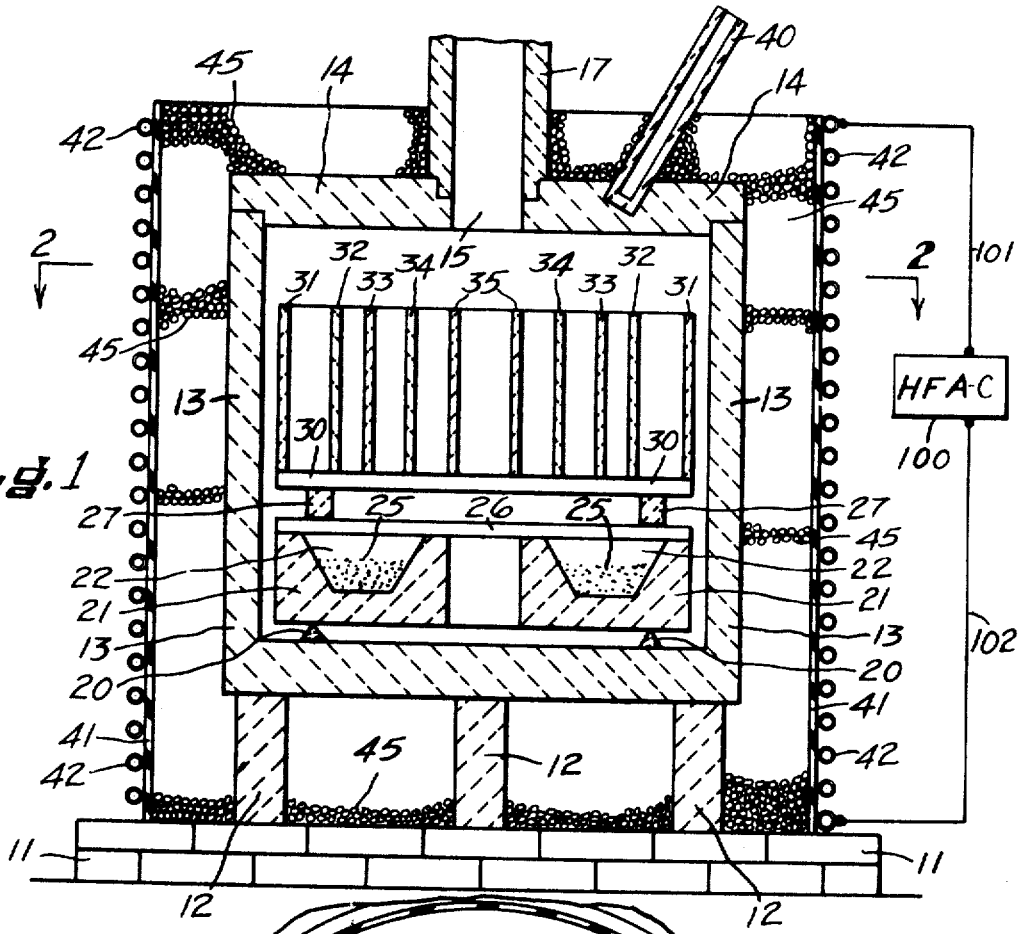

The invention relates to silicon carbide crystals and processes and furnaces for making them.

This application is a *reissue of Pat. 3,147,159, issued Sept. 1, 1964, which patent was a* division of my copending application Ser. No. 784,791, filed Jan. 2, 1959, now Pat. No. 3,025,192.

One object of the invention is to produce crystals of silicon carbide containing total impurities not greater than 1000 p.p.m. (parts per million) and having a specific electrical resistance at room temperature in the range from 0.1 to 1000 ohms cm. Another object of the invention is to produce crystals for the manufacture of rectifiers especially for use at high temperatures. Another object of the invention is to produce crystals for use as transistors especially for use at high temperatures. Another object is to produce thin plate-like crystals of silicon carbide with parallel faces, transparent or translucent and free of inclusions or other physical defects.

Another object is to produce silicon carbide crystals of n-type conductivity. Another object is to produce silicon carbide crystals of p-type conductivity. Another object is to provide components for the manufacture of rectifiers and transistors which require sometimes crystals of n-type conductivity and at other times require crystals of p-type conductivity. Another object is to provide processes for making silicon carbide crystals of n-type conductivity of varying value. Another object of the invention is to provide processes for making silicon carbide crystals of p-type conductivity of varying value. Another object is to achieve the last two objects while limiting the specific electrical resistance (resistivity) at room temperature to the range of 0.1 to 1000 ohms cm.

Another object of the invention is to provide new tools for use in research on semi-conducting materials for the development of electronic devices. Another object is to provide a material useful as in the preceding object which will withstand higher temperatures than materials heretofore generally used. Another object is to produce silicon carbide crystals for use in electronic apparatus out of low cost raw material. Another object is to provide processes for the production of silicon carbide crystals of the type indicated which are flexible in use and susceptible to careful control. Another object is to provide crystals of silicon carbide of hexagonal form of large sizes and high purity. Another object is to produce such crystals and others of silicon carbide in the narrow range of 1–10 ohms cm. and in other narrow ranges also for the production of useful electronic devices and for research.

Another object is to provide parallel face articles to compete to advantage with thin plates of germanium, silicon and other materials for use in electronic devices such as rectifiers and transistors. Another object is to provide such articles which can withstand higher temperature than germanium ad silicon in use. Another object is to produce crystals for use in transistors, rectifiers and other electronic devices which can readily be soldered to metal wires for the manufacture of such devices. Another object is to produce silicon carbide crystals having both n-type and p-type conductivity in different parts thereof with a p-n junction between them.

Another object is to provide a simple furnace for the production of these crystals. Another object is to provide varying furnace constructions for various requirements in manufacturing to produce silicon carbide crystals of different parameters including sizes, resistivity, conductivity, n or p, as desired. Another object is to provide a furnace readily permitting the addition of desired elements into the silicon carbide to control the properties of the crystals. Another object is to provide a furnace wherein a temperature gradient can be established and controlled. Another object is to provide a furnace with facilities for controlling the atmospehre therein and for changing the atmoshpere as desired. Other objects are to provide processes carrying out various objects specified for the furnaces, that is to say to achieve the controls herein stated whether the specific improvement be classified as involving a process or an apparatus. Another object is to provide large size silicon carbide crystals with parallel faces and of very high purity and also, when desired, to add thereto other elements in controlled amounts to produce different kinds of crystals for electronic and other uses. Another object is to provide a process and an apparatus for producing these crystals in such a condition relative to the matrix material that they can readily be separated from it. Another object is to produce these crystals at lower temperatures than those at which silicon carbide crystals of the type described have been heretofore produced. Another object is to provide processes which are economical of the furnace and its parts. Another object is to provide processes which require less power than heretofore.

Other objects will be in part obvious or in part pointed out hereinafter.

Figure 2:
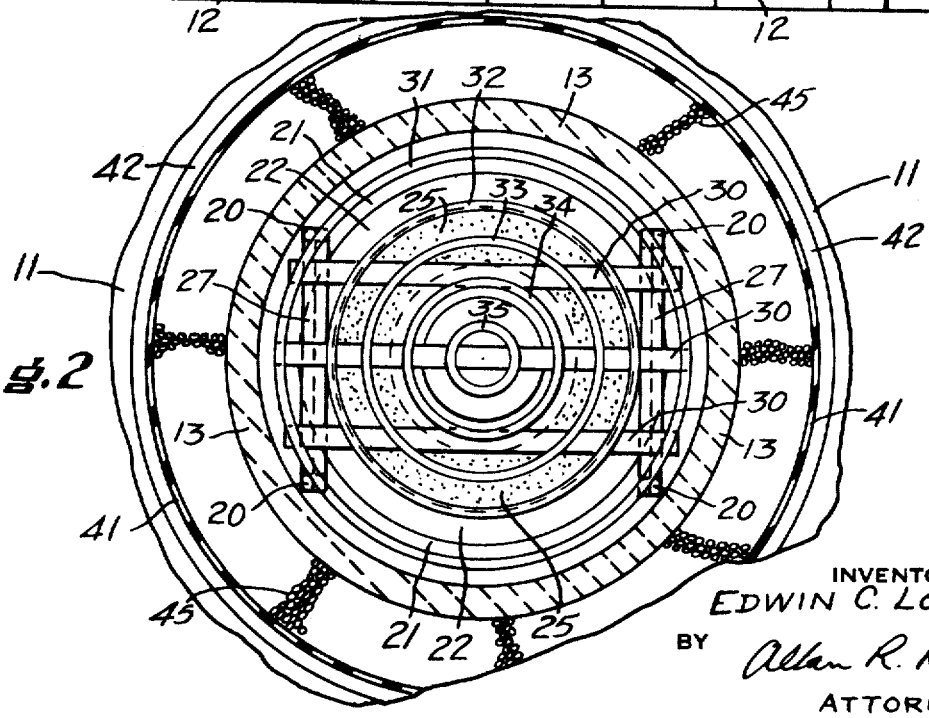
Figure 3:
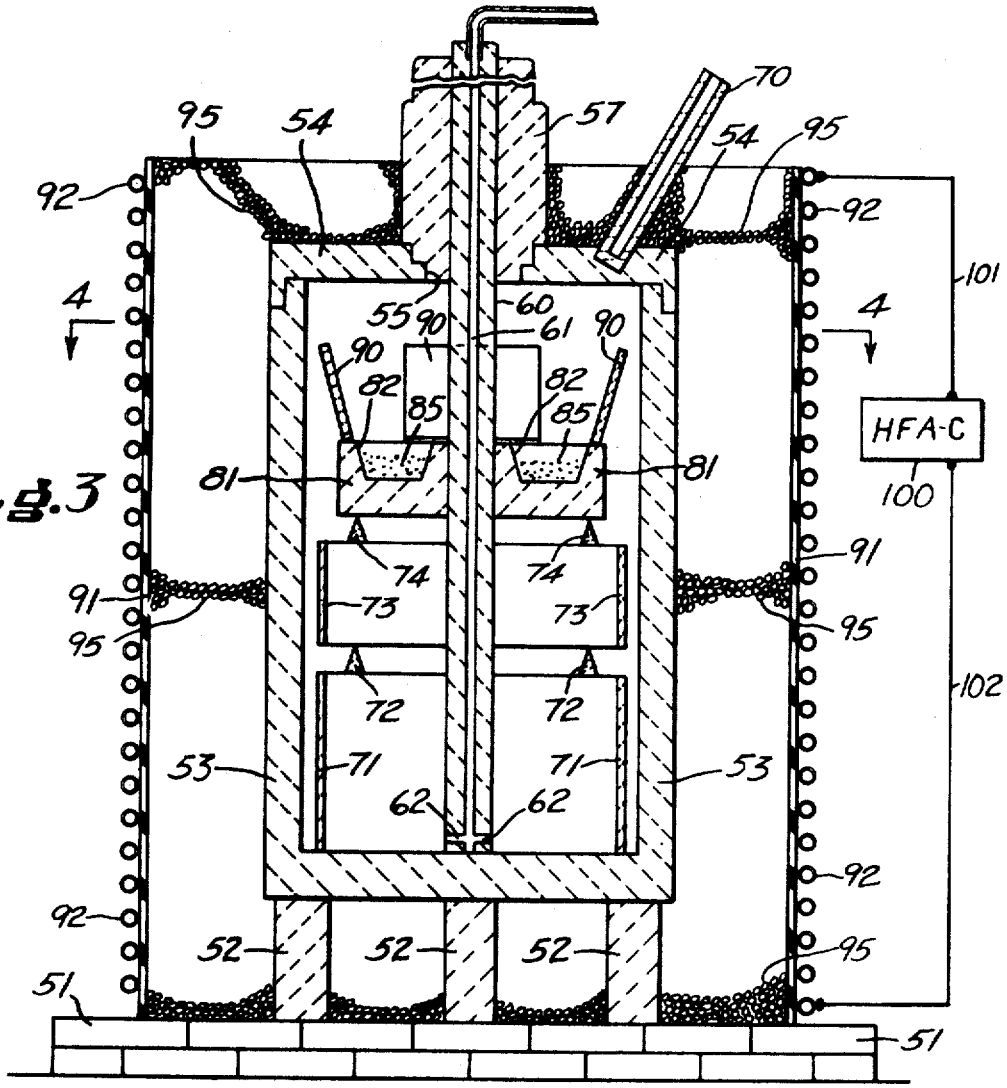
Figure 4:
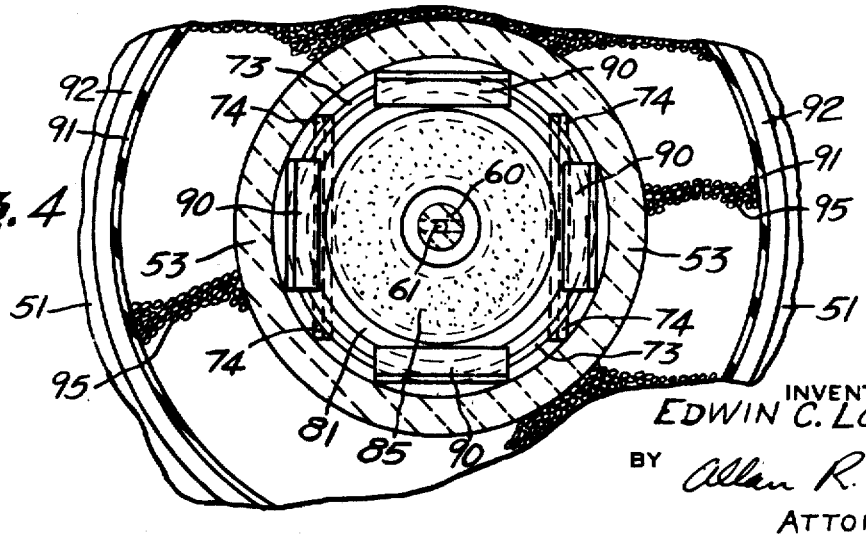

In the accompanying drawings illustrating typical apparatus for making the crystals and for carrying out the processes and as embodiments of furnaces according to the invention, FIG. 1 is a vertical sectional view of a furnace according to the invention, FIG. 2 is a cross sectional view taken on line 2—2 of FIG. 1, FIG. 3 is a vertical sectional view of another furnace according to the invention, FIG. 4 is a horizontal cross sectional view taken on the line 4—4 of FIG. 3.

Modern solid state rectifiers operate by virtue of the presence of p-n junctions. A crystal of germanium or silicon is doped in such a way that one part contains an electron donor, making it an n-type conductor, while the remainder contains an electron acceptor, making it a p-type conductor. The junction between the two regions, the so-called p-n junction, conducts electricity in one direction only and therefore acts as a rectifier. Transistors are somewhat similar, the most common type consisting of three regions in a single crystal, which may be two p regions separated by an n region (PNP type) or two n regions separated by a p region (NPN type). All these devices depend for their operation on reliable control of the type and amount of conduction in the various regions of the crystal noted above. This control is possible only if the pure crystal is substantially non-conducting, i.e., the conductivity must come from the added impurity and not be intrinsic to the lattice of the crystal itself. In general all crystals start to conduct intrinsically at a high enough temperature, and the principal consideration that determines the maximum allowable temperature is the energy gap. This figure, usually measured in electron volts, is the energy required to free an electron from a covalent bond in the particular material concerned and make it available for conduction. The energy gap for Ge is about 0.7 electron volt, that for Si is about 1.1 electron volts, while the figure for SiC has been estimated at nearly 3.0 electron volts. As a result of this fact, germanium devices cannot be used above 100° C. at the most, Si goes up to about 200° C., while SiC has been used experimentally above 600° C. and the upper limit is not yet known. Both theory and the experimental data that have been made public to date indicate that the temperature limit for SiC is far above that of the materials that are in commercial use at present in semiconducting devices.

In these rectifiers, one region is the crystal itself as made which therefore must be a p-type crystal or an n-type crystal, and the other region is a region of the crystal which has been treated in a known way that I don't need to describe. In the transistors the situation is similar, the intermediate region being the crystal itself without change which therefore must be n-type or p-type and the other regions having been treated. This type of treatment is known as "doping," and that which is used to dope is called a "doping agent." Also whatever it is in the atmosphere that makes a crystal p-type or n-type is referred to as a "doping agent."

Most materials conduct electricity to some extent and a number of mechanisms have been isolated. For example, practically all metals conduct by virtue of the presence of many free electrons. One of the criteria of metallic bonding is that the electrons are immediately available for conduction and there is no specific increment of energy that must be available to mobilize electrons in the lattice. On the other hand, many materials such as pure Ge, Si and SiC have covalent bonding. The electrons are held in place and can be freed for conduction only by supplying a specific amount of energy, which is quite large for SiC. Such materials can be made into n or p type conductors by addition of suitable donor (electron providing) or acceptor (electron absorbing) doping agents. Thus SiC can have either n or p type conductivity imparted to it by doping agents, as will be described. This is done by providing a specific atmosphere during the growth of the crystal, the later doping above explained is done after the crystal has been made in order to make a rectifier or a transistor and is a process with which my invention is not concerned.

The process of the present invention comprises heating elemental silicon to a temperature at which it has an appreciable vapor pressure in the vicinity of or at its boiling point in a carbon enclosure containing suitably arranged carbon surfaces. Generically carbon means ordinary carbon (in the specific sense) and graphite, which is preferred, but ordinary carbon can be used. As a result of a reaction between the silicon vapor and the carbon, large numbers of plate-like silicon carbide crystals grow from the carbon surfaces. On cooling the furnace, the crystals are detached from the surfaces and are collected. They can be easily detached from ordinary carbon or graphite. Sometimes in doing this they are broken but usually this does not matter. The atmosphere in the container may be controlled throughout the heating and cooling cycle to obtain the desired purity in the crystals, or to introduce addition agents during their growth.

I have found that it is necessary to have a temperature gradient in the interior of the heated carbon enclosure because the crystals will grow properly from the carbon surfaces only down a temperature gradient. Since the wall of the enclosure constitutes the source of heat, being heated by induction, the temperature gradient is usually from the hot wall to the somewhat cooler center. Under such conditions, the crystals grow from the carbon surfaces that face inward. The outward-facing surfaces become covered with a coating of silicon carbide, but no large crystals are formed.

Since the cylindrical wall of the container is generally the source of heat, temperature gradients are determined by the placement of the graphite crystal-growing surfaces, and by the use of heat sinks, such as a central gas vent. The evaporating silicon provides an excellent heat sink.

Referring now to FIGS. 1 and 2, a fire brick base 11 supports graphite blocks 12 which support a graphite container 13 having a graphite cover 14 with a central hole 15 the top of which is counterbored to receive a graphite chimney 17. On the bottom of the container 13 are graphite supporting bars 20 supporting a ring-shaped graphite crucible 21 which has an annular trough 22 that may be of the shape shown or any other convenient shape into which is charged a quantity of silicon 25 such as in the form of lumps. Although I believe that the best results can be achieved using purer silicon, that which I have had and used with highly satisfactory results analyzed silicon, 97.39%; aluminum, 1.21%; iron 0.90%.

Although my furnace was heated inductively with high frequency alternating current, employing graphite as the electrical receptor, I can achieve the same general results by electrical resistance heating employing a graphite tube as the resistor by methods and apparatus details well known in the electric furnace art.

Supported by the graphite crucible 21 are graphite bars 26 which support graphite bars 27 which support graphite bars 30 upon which rest cylindrical graphite sleeves (thin walled hollow cylinders) 31, 32, 33, 34 and 35. It is upon the insides of these sleeves that the crystals grow. By induction the vertical cylindrical wall of the crucible 13 receives the heat and by conduction the bottom of the crucible 13 loses heat downwardly and the chimney 17 and hole 15 lose heat upwardly. There is therefore a temperature gradient from 31 to 35 and there is a gradient of dropping temperature from the inside of each graphite sleeve to the next one and from the sleeve 35 to the center of the apparatus. It is this which promotes the crystal growth. Furthermore, although the temperature may be fairly closely controlled as indicated by pyrometric graphite tube 40, conditions vary enough so that the overall temperature gradient from 31 to 35 gives a chance for very good crystal growth on the inside of one of the sleeves and also different sizes and thicknesses of crystals on the insides of the various sleeves which results in the manufacture of crystals of various kinds and sizes to make a diversified product to meet the demands of industry.

There can be a further provision for heat transfer in this embodiment of the furnace and in the other one to be described. The present belief is that the growth of plate-like crystals is assisted by the presence of cool spots in the furnace, so placed that the flat faces of the growing crystals can radiate to them. These cool spots therefore serve as heat sinks to absorb the heat of sublimation of the SiC as it deposites. In the furnaces described herein, such heat sinks are provided by the central vent, the boiling silicon and by leakage of heat through the supporting firebrick under the furnace.

Resting on the firebrick base 11 outside of the container 13 is a cylindrical asbestos sleeve 41 outside of which is the induction coil 42 energized by high frequency electric energy, and induction furnaces are now so well known that I do not need to describe this water cooled coil 42 nor the freqency or electromotive force, current, power and the like by which it is energized as these matters are well understood in the art. The space between the sleeve 41 and the container 13 and under the container 13 and over the cover 14 is filled with zirconia insulating grain 45 as this is refractory enough to withstand the highest temperatures of the apparatus which are found on the outside of the cylindrical wall of the container 13 and as zirconia is a good thermal insulator. Any other insulating material which can satisfactorily meet the requirements can be used.

To grow crystals in accordance with the invention, the crucible 21 was charged with fourteen pounds of silicon and the temperature of the cover 14 as measured by the optical pyrometer was raised to 2400° C. in 3½ hours and it was maintained between 2390° C. and 2410° C. for an additional 4 hours. Then the furnace was allowed to cool and the top insulation and graphite cover 14 were removed. A large number of transparent plate-like crystals of the silicon carbide up to ¾ of an inch across and from very light to dark green in color were found on the inner surfaces of the coaxial sleeves 31–35 inclusive. The sleeves 31, 32 and 33 had the most crystals of the larger sizes. On the outside of the sleeves a smooth, finely crystalline coating of silicon carbide had formed. Some crystals grew on the insides of the sleeves 34 and 35. Stripping the crystals off of the relatively soft graphite was not at difficult job. It will be seen that the sleeves 31–35 are completely independent of each other mechanically and therefore there is easy access to the crystals on the inside of the sleeves.

Provided the silicon vapor has access to the graphite surfaces upon which the crystals are to grow and provided the temperature gradients are maintained, the dimensions of the furnace are not critical, bus as illustrating the embodiment of FIGS. 1 and 2, the diameter of the sleeve 31 was twenty-four inches, of the sleeve 32 was eighteen inches, of the sleeve 33 was fourteen inches, of the sleeve 34 was nine inches and of the sleeve 35 was four inches, all these being outside diameters, and the rest of the furnace was in proportion as shown in the drawing. This explanation gives more meaning to the parameters of time and temperature and of the quantity of the silicon charge.

The crystal growth on the sleeves 31, 32 and 33, which can also be called cylinders, was chiefly at the top and bottom thirds of the areas, on the inside as stated. The middle third didn't grow many crystals. The crystals also grew on the underside of the bars 30, in fact the largest crystals were found there. They also grew on the underside of the bars 26. In each place where the crystals grew there was a decreasing heat gradient in the direction of the growth of the crystals. All the crystals grew normal to the surfaces on which they were formed. They grow in directions parallel to the faces. Some of the crystals that I have made have been as thin as 1 mil and some of these are truly flexible but very delicate. Others have been as thick as 100 mils or more.

In this particular run crystals were up to three-quarters of an inch in longest dimension but many were as small as one-quarter of an inch in diamension and some were smaller, but most of them showed the typical crystal angle of silicon carbide of 120°. This angle is usually found at the junction of the edges opposite the surface on which the crystal grew.

The atmosphere in the furnace was originally air but the oxygen of the air was soon exhausted by combining with the carbon of the graphite to form CO and so then the atmosphere became carbon monoxide and nitrogen. The nitrogen definitely affected the crystals, entering into them as an electron donor in the silicon carbide and producing n-type crystals. Several thousand crystals were produced in this particular run. As they contained a large amount of nitrogen, exact amount not determined, the conductance of the few tested was high, resistivity low (of the order of .002 ohm cm.) but they were of good size and quality otherwise.

The apparatus of FIGS. 1 and 2 can be operated with other atmospheres. For example, by inserting a refractory pipe down the chimney 17 and connecting that to an iron pipe outside leading to a source of gas under pressure, almost any gas can be introduced into the furnace, meaning the space inside of the container 13. If argon is so run into the furnace starting before high temperatures have been reached, the nitrogen is mostly eliminated and other gases are eliminated and quite pure silicon carbide crystals are produced. But leaving a little nitrogen in the atmosphere the n-type crystals are produced. Similarly phosphorus and arsenic produce n-type crystals and to provide phosphorus as a doping agent, phosphorus trichloride or phosphorus hydride can be used, and to provide arsenic as a doping agent arsenic trichloride can be used, likewise antimony trichloride can be used as a donor doping agent which produces n-type crystals.

Boron and aluminum as doping agents produce p-type crystals. To add boron, its trichloride can be added to the atmosphere in the manner above indicated and to add alumium, its trichloride also can be used. These gaseous compounds are best added with a flow of inert gas such as argon or helium, but because argon has a much higher specific gravity, I prefer it to helium and the other inert gases are expensive As the apparatus is used, the cylindrical wall of the graphite container 13 is oxidized on the outside and it is not always convenient to ascertain how much of the wall has thereby been consumed. This cylindrical wall of the container 13 when it is new absorbs practically all of the electromagnetic field, but when it is thin, this field releases energy in the sleeves 31–35 and also in the crucible 21. On occasions I have found that the heat gradient was reversed and crystals began to grow on the outside of some of the sleeves 31–35. For better control of the process and to stop this phenomenon, the sleeves 31–35 can be slotted vertically which breaks the circuit and then they absorb little of the energy of the electromagnetic field. By slotting I mean that the circle of the sleeves is broken and it should be broken in such a way that the bars 30 do not complete the circuit. The fact that sometimes the crystals grow on the outside of some of the sleeves when taken in connection with the fact that then the heat was developed in the sleeves and that normally they grow on the inside and that there is a definite heat sink at the axis of the furnace, proves my theory that they grow towards a down temperature gradient.

Above the location of the middle block 12 in the container 13 is what I call a heat sink and the hole 15 in the graphite cover 14 is also a heat sink. This word of slang derivation means that the heat is escaping at those locations. One feature of the process is having a heat sink above and below the cylindrical sleeves or plates where the crystals grow, with the axis of the heat sinks (in this case the axis of the container 13) parallel or nearly parallel to the faces of the graphite, in the case FIG. 1 parallel to elements of the cylindrical surfaces of the sleeves 31–35. This keeps the crystals growing horizontally with their faces horizontal and produces the best crystals.

The foregoing description constitutes one example of the invention as to the process and the apparatus. Typical variations to produce specific results have been indicated.

As the result of the work done in the furnace of FIGS. 1 and 2, an improved furnace illustrated in FIGS. 3 and 4 was devised. A firebrick base 51 supports graphite blocks 52 which support a graphite container 53 having a graphite container 53 having a graphite cover 54 with a central hole 55 the top of which is counterbored to receive a graphite chimney 57. Extending through a vertical axial bore in the chimney 57 is a graphite tube 60 having a fine vertical axial bore 61 which communicates with diametral bores 62 to lead any desired gas to the inside of the container 53 from which it escapes between the cover 54 and chimney 57 and between the chimney 57 and the tube 60 and between the cover 54 and the container 53, thus maintaining a flow of gas. A graphite pyrometric tube 70 like the tube 40 of FIG. 1 is provided for the same purpose of controlling the temperature. A cylindrical graphite sleeve 71 rests upon the bottom of the container 53 coaxial with it and this supports graphite bars 72 which support a cylindrical graphite sleeve 73 which supports graphite bars 74 which supports a graphite crucible 81 of the same shape as the crucible 21 having an annual trough 82 into which is charged a quantity of silicon 85 in the form of lumps. Resting on the upper lip of the crucible 81 and against the inside wall of the container 53 are graphite plates 90. A cylindrical asbestos sleeve 91, a high frequency induction coil 92, and a mass of zirconia 95, these being like the parts 41, 42 and 45, completes the furnace of FIGS. 3 and 4.

The graphite plates 90 are plane surface plates. Such plates are cheaper than cylindrical sleeves which must be machined from large graphite bars and the plates are available in higher purity grades of graphite. So long as they are placed in the furnace in such a way that the flow of heat is normal to the surfaces which is the case illustrated in FIG. 3 since the hole 55 is a "sink," the crystals grow down the temperature gradient from the inside cooler face.

In operating the apparatus of FIGS. 3 and 4, some crystals were formed on the inside of the plates 90, but also a good many crystals were formed on the insides of the sleeves 71 and 73. The atmosphere of silicon moves all through the chamber formed by the container 53 to grow crystals wherever there is a downward heat gradient. As a guide to the sizes of various parts of FIGS. 3 and 4, the container 53 had an outside diameter of 24 inches.

In a successful run of the apparatus of FIGS. 3 and 4, seven pounds of silicon were charged into the crucible 81 and argon was supplied through the bore 61 at the rate of 8 litres per minute at the start when the power was turned on, reduced to 4 litres per minute when the temperature reached 1280° C. and maintained at that rate of flow. The argon had been purified so that it was practically free of all other gases and it was preheated to a temperature of 890° C. In two hours and fifteen minutes the temperature had reached 2060° C. as read in the pyrometric tube 70. In two hours and fifty minutes the temperature had reached 2400° C. The temperature was maintained at substantially this figure for four hours and forty-five minutes and then the power was turned off, but the argon was left flowing for eighteen more hours whereupon the furnace was opened.

Many large, about half inch size, blue crystals were recovered from the inside of the sleeves 71 and 73. Some crystals grew on the outside cylindrical wall of the crucible 81. Some grew on the outer wall of the trough 82. The crystals on the insides of the sleeves 71 and 73 extended from top to bottom thereof and all around. There were many hundreds of these. From top to bottom of the plates 90 crystals grew on the inner faces. There were many hundreds of these. The crystals collected from the plates were smaller than those collected from the sleeves. Although many of the crystals were green, there were also grey crystals, blue crystals and yellow crystals and some which were almost colorless.

I estimated that the number of large crystals, half an inch across and over, collected in this run was 500 to 700. I estimated that the number of crystals, ⅜" to ½" across, collected in this run was about 1000. I estimated that the number of crystals 3/16" to ⅜" collected in this run was about 1000 to 1500. Some crystals from these and other similar runs were tested for resistivity. About 14% of those tested had resistivity within the range of 0.01 ohm cm. to 0.1 ohm cm., about 18% of those tested had resistivity within the range of 0.1 ohm cm. to 1.0 ohm cm., about 14% of those tested had resistivity within the range of 1.0 ohm cm. to 10 ohms cm., and about 54% of those tested had resistivity over 10 ohms cm. but well below 1000 ohms cm. These are useful ranges. All of these crystals, and presumably all of those made during these runs where argon was introduced into the furnace but no other gas *was added,* had n-type conductivity due to the small amount of nitrogen remaining and diffusing into the furnace. The crystals had faces that were parallel to each other within at least about 1°, when discontinuities are allowed for that may occur at their point of attachment to the piece of carbon upon which they were grown. [I have examined many commercial lots of silicon carbide made for grain purposes and I have never seen any crystals selected from silicon carbide lots or from any other source that come anywhere near meeting this parallelism description.]

The resistivity measurements were made by placing the silicon carbide crystal to be tested on a non-conducting surface and pressing four hard steel probes arranged in a straight line against the crystal under the pressure of small individual springs. Direct current was led into and out of the crystal with the two end probes and voltage measurements were taken between the two center probes. The applied D.C. voltage was adjusted to produce a few milliamperes of current through the crystal and this current was accurately measured with a milliameter. The voltage measurement between the center probes was made with a vacuum tube voltmeter with very high input impedance of the order of $10^{12}$ ohms. A correction was applied to the results to compensate for the geometry of each crystal being measured, according to computation formulas well known to those skilled in the art. The measurements were all made at room temperature, and the resistivity figures quoted all correspond to this temperature.

As the apparatus of FIGS. 3 and 4 works better than the apparatus of FIGS. 1 and 2 and as I do not have in mind now any apparatus which I believe to be better than the apparatus shown in FIGS. 3 and 4, those figures and the description thereof represent the best mode of the invention for the furnace and the apparatus. There is no such thing as the best mode of the invention so far as the crystals are concerned. Industry wants some very thin ones and some thicker ones within the limits given nor am I aware of all the requirements that will be met so far as sizes are concerned. So long as the SiC crystals have constituents, other than silicon and carbon, present in amounts not greater than about 1000 parts per million, including donor and acceptor impurities, they are satisfactory in respect to purity. Various resistivities are wanted and mostly in the range of about 0.1 to about 10 ohms cm. but going up to about 1000 ohms cm. As explained, crystals of n-type conductivity and crystals of p-type conductivity are wanted and one is about as important as the other. Present demands are that the crystals should be at least ⅛ of an inch in longest dimension, but any size in area would probably be satisfactory above a small area having the longest dimension ⅛ of an inch because the crystals could be broken. However it is better not to do this and at present there doesn't seem to be a demand for crystals having a longest dimension greater than ¾ of an inch. Crystals smaller than ⅛", for example 1/16", can be grown by my process and used for many purposes.

It is convenient, instead of speaking of the longest dimension, to refer to the dimension of a crystal perpendicular to the bisector of the edge angle of 120° for a complete crystal as grown, when the edge angle is present on the crystal and can be used for measurement. For those not showing the 120° angle, such as broken crystals, the largest dimension simply means the greatest dimension it is possible to measure on a crystal.

So far as the process is concerned, the best mode that I know of now is the operation of the apparatus of FIGS. 3 and4 and the run described where seven pounds of silicon were charged into the crucible and argon was supplied at the rate of eight litres per minute and reduced to four litres per minute when the temperature reached 1280° C. However, this doesn't mean that there is anything significant about that particular charge or about the rate of flow of the argon. Obviously the greater the amount of silicon contained in the original charge, the longer can the process be carried on without interruption. The rate of flow of the argon is entirely dependent upon what results are wanted, what other gases are used, how much air diffuses into the furnace chamber and so many other factors that it is impossible to state the optimum rate of flow.

The cylindrical wall of the container 13 can be called a peripheral wall and it is this which receives the electrical energy to produce the heat. This wall and the sleeves 31–35, the bars 20, 26 and 27, the sleeves 71 and 73, the bars 72 and 74 and the plates 90 can all be made out of amorphous carbon as well as out of graphite and the generic name for these two substances is simply carbon. The crucibles 21 and 81 could be made out of amorphous carbon as well as out of graphite.

The wall of the container 53 is likewise a peripheral wall and can be made of amorphous carbon as well as of graphite.

The atmosphere for the process so that the resistivity will not drop below 0.1 ohm cm. which is desired should be not more than about 1 mol percent of $N_2$. So long as a particular run is continued, there will be free carbon in the furnace and the amount of oxygen will therefore be practically negligible. While hydrogen attacks the graphite to some extent, it can be used as a protective gas. As a protective gas I prefer the inert gases, especially argon and helium, of which the former is preferred. Carbon monoxide can also be used. The atmosphere is therefore one containing not more than about 1 mol percent of nitrogen, substantially no oxygen and the remainder a protective gas selected from the group; hydrogen, carbon monoxide and the inert gases and mixtures thereof. Since one gram molecular weight of all gases occupies the same volume, mol percents are the same as volume percents for gases.

The temperature to which to heat the piece of carbon upon which the crystals are to be grown is between about 2300° C. and about 2500° C. The downward temperature gradient should extend in a generally normal direction away from the surface of said piece of carbon. Another temperature gradient is in a general direction perpendicular thereto as previously explained. There were thus two temperature gradients in the process and apparatus that I have used. The one which is approximately perpendicular to the surface of the piece of carbon I know to be necessary, but I do not know that the other one which is roughly parallel to the surface is necessary although I believe it is at least desirable.

Heat sinks have been described. Due to the configuration of the furnaces and the locus of the generation of heat, the central zone of the furnace around the axis is a heat sink. The tube 60 of FIGS. 3 and 4 is a heat sink because it contains gas which is not as hot as the plates 90, for example. The top of the furnace and the bottom of the furnace is a heat sink. The silicon 25 and the silicon 85 constitute heat sinks. Silicon could merely be dumped into the container 13 or the container 53, but it is better to provide a crucible for it. This prevents it from spreading all over the bottom of the crucible and from otherwise making a means of the apparatus.

In all cases it is better to have it symmetrically located in the chamber relative to the axis of the peripheral wall of graphite meaning in the illustrative embodiments the cylindrical wall of the container 13 or of the container 53.

The bottom of the container 13 is a closure and so is the bottom of the container 53. The covers 14 and 54 are also closures although the hole 15 and chimney 17 make the closure of FIG. 1 incomplete. Nevertheless it is contemplated that inert gas will be used in sufficient quantity to raise the resistivity to at least .1 ohm cm. so that even in FIGS. 1 and 2 there is closure means making with the peripheral wall a chamber.

The zirconia 45 and 95 constitutes thermal insulation outside and surrounding the peripheral walls. The coils 42 and 92 are primary coils around the thermal insulation coaxial with the peripheral wall. In FIGS. 1 and 3 a source of high frequency A.C. current electric energy 100 connected by lines 101 and 102 to the ends of the primary coils respectively is diagrammatically shown. The peripheral walls of graphite are the secondaries to the primary coils 42 and 92.

It is sufficient for some purposes if crystals have a dimension in the direction perpendicular to the bisector of the 120° angle of at least ⅛ of an inch. However, for many uses it is better that this dimension be at least ¼ of an inch. Many crystals are wanted which have this dimension as great as ½ an inch. As to thickness, I have made crystals as stated from 1 mil to 100 mils thick. My process and furnace will upon occasion produce crystals as thin as ½ a mil.

I have tried to measure the temperature gradients in the furnaces but without success. At the temperatures involved, small differences are quite difficult to measure. However, I am confident that the decreasing temperature gradient extending in the radial direction in the furnace extends for a distance at least equal to the maximum dimension of the largest crystal to be formed, which is often at least ½", and another temperature gradient which, with the apparatus I have used, is a vertical temperature gradient and extends for a distance of at least 5" in most cases.

In order to produce silicon carbide crystals having both n-type and p-type conductivity in different parts thereof with a p-n junction between them, provide first an atmosphere containing a doping agent which has an electron donor constituent and later an atmosphere which has an electron acceptor constituent, or vice versa.

It will thus be seen that there has been provided by this invention silicon carbide crystals and processes and furnaces for making them in accordance with which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

[1. Process for the production of crystals of hexagonal silicon carbide adapted for use in electronic equipment, with parallel faces, comprising providing an atmosphere containing not more than about 1 mol percent of nitrogen, substantially no uncombined oxygen and the remainder a protective gas selected from the group consisting of hydrogen, carbon monoxide and the inert gases and mixtures thereof, locating in this atmosphere at least one mass of elemental silicon and at least one piece of carbon, heating the entire assembly to a temperature between about 2300° C. and about 2500° C., and providing a significant downward temperature gradient extending in a generally normal direction away from the surface of said piece or pieces of carbon for a distance at least equal to the maximum dimension of the largest crystal to be formed.]

[2. Process for the production of crystals of hexagonal silicon carbide according to claim 1 in which heat sinks are located to receive heat radiating from the parallel surfaces of the growing crystals.]

[3. Process for the production of crystals of hexagonal silicon carbide according to claim 2 in which the protective gas is principally an inert gas.]

[4. Process for the production of crystals of hexagonal silicon carbide according to claim 3 in which the atmosphere contains an electron donor.]

[5. Process for the production of crystals of hexagonal silicon carbide according to claim 1 in which the protective gas is principally an inert gas.]

[6. Process for the production of crystals of hexagonal silicon carbide according to claim 5 in which the atmosphere contains an electron acceptor.]

[7. Process for the production of crystals of hexagonal silicon carbide according to claim 1 in which the atmosphere contains an electron acceptor.]

[8. Process for the production of crystals of hexagonal silicon carbide according to claim 7 in which heat sinks are located to receive heat radiating from the parallel surfaces of the growing crystals.]

[9. Process for the production of crystals of hexagonal silicon carbide according to claim 8 in which the protective gas is principally an inert gas.]

[10. Process for the production of crystals of hexagonal silicon carbide according to claim 1 in which the protective gas is principally an inert gas and in which the atmosphere contains an electron acceptor.]

[11. Process for the production of silicon carbide crystals for electronic purposes having both n-type and p-type conductivity in different zones of the same crystal by operating a process according to claim 1 in which atmosphere is varied during the crystallization process to have an electron donor present during part of the run and an electron acceptor present during another part of the run.]

[12. A process for the production of plate-like crystals of hexagonal silicon carbide, said crystals having substantially parallel faces comprising assembling a spaced series of generally vertically disposed carbon walls, enclosing said walls within a furnace chamber, positioning a body of elemental silicon in vertically spaced relation to said carbon walls and within said chamber, heating said furnace to a temperature at which the silicon has a vapor pressure in the vicinity of its boiling point, said heating being effected by delivering heat to the furnace from one side of said walls of carbon, flowing an inert gas through said furnace to remove heat therefrom, and controlling the heat flow away from the other side of each of said walls, whereby to provide a significant heat sink that functions to grow large silicon carbide crystals on said walls in the direction of the downward temperature gradient by reacting the silicon with the carbon, the size of the crystals formed on the carbon walls being different dependent upon the specific temperature gradient existing between the adjacent walls within the furnace.]

13. *In a process for the production of crystals of hexagonal silicon carbide adapted for use in electronic equipment wherein there is provided in a high-temperature furnace at least one piece of carbon having an extended surface and at least partially surrounding said piece of carbon with a carbon heating element which heats said first piece of carbon primarily by radiation so that more heat is applied to one surface of said piece of carbon than to the other surface and one surface of the carbon piece is cooler than the other, wherein a substantial partial pressure of silicon-containing vapors is maintained in the vicinity of said cooler surface, and wherein large thin silicon carbide crystal plates are grown extending roughly normal to the cooler surface of the carbon by providing a radiant heat sink positioned to receive heat radiating from at least one flat face of the growing crystal in a direction which is roughly parallel to said carbon surface, the improvement which comprises providing a source of elemental silicon to generate an appreciable vapor pressure of silicon in the furnace and maintaining the volume between the carbon heating element, the source of elemental silicon vapors and the first piece of carbon essentially free of solid silicon carbide to provide a free flow of silicon-containing vapors between the source, the hot portions of the carbon heating element and the cooler carbon surface on which the crystals grow.*

14. *The process of claim 13 wherein the elemental silicon source is heated by radiation from the carbon heating element so that the carbon heating element is maintained at a higher temperature than the source.*

15. *The process of claim 13 wherein the elemental silicon source is maintained at a lower temperature than the growing crystals and in position to receive heat radiating from the growing crystals.*

References Cited

The following references, cited by the Examiner, are of record in the patented file of this patent or the original patent.

UNITED STATES PATENTS

| | | |
|---|---|---|
| 1,937,060 | 11/1933 | Hutchins. |
| 2,431,327 | 11/1947 | Geiger. |
| 2,854,318 | 9/1958 | Rummel. |
| 2,859,142 | 11/1958 | Ptann. |
| 2,862,797 | 12/1958 | McKay. |
| 2,868,678 | 1/1959 | Shockley. |
| 2,908,553 | 10/1959 | Frank et al. |
| 2,913,313 | 11/1959 | Schroll. |
| 2,677,627 | 5/1954 | Montgomery et al. |
| 1,013,700 | 1/1912 | Tone. |
| 2,178,773 | 11/1939 | Benner et al. |
| 2,854,364 | 9/1958 | Lely et al. |
| 3,275,415 | 9/1966 | Chang et al. |

OTHER REFERENCES

U.S. Publication Board, PB 135 545, Report No. 1, Mar. 13, 1959.

Transactions of the Electrochemical Society, vol. 68, 1935, pp. 18 and 20.

OSCAR R. VERTIZ, Primary Examiner

G. T. OZAKI, Assistant Examiner

U.S. Cl. X.R.

148—33